United States Patent [19]
Cuddihy et al.

[11] Patent Number: 5,608,629
[45] Date of Patent: Mar. 4, 1997

[54] VEHICLE CRASH DATA GENERATOR

[75] Inventors: Mark A. Cuddihy, New Boston; J. B. Drummond, Jr., Southfield; Daniel J. Bourquin, Dearborn, all of Mich.

[73] Assignee: Ford Motor Company, Dearborn, Mich.

[21] Appl. No.: 365,381

[22] Filed: Dec. 27, 1994

[51] Int. Cl.⁶ .............................. B60R 21/00; G06F 7/06
[52] U.S. Cl. .................... 364/423.098; 364/553; 364/571.02; 364/424.045; 364/424.034; 307/9.1; 307/10.1; 280/735
[58] Field of Search ............. 364/424.05, 424.03, 364/424.04, 551.01, 553, 554, 556, 571.01, 572, 576; 307/9.1, 10.1; 73/12.01, 514, 517 B; 280/735; 180/282

[56] References Cited

U.S. PATENT DOCUMENTS

| | | | |
|---|---|---|---|
| 3,870,894 | 3/1975 | Brede et al. | 307/9.1 |
| 4,524,603 | 6/1985 | Hargunani et al. | 73/12.01 |
| 4,707,823 | 11/1987 | Holdren et al. | 359/115 |
| 4,873,867 | 10/1989 | McPherson et al. | 73/493 |
| 4,979,763 | 12/1990 | Blackburn | 280/735 |
| 4,992,943 | 2/1991 | McCracken | 364/424.04 |
| 5,034,891 | 7/1991 | Blackburn et al. | 364/424.05 |
| 5,036,467 | 7/1991 | Blackburn et al. | 364/424.05 |
| 5,040,118 | 8/1991 | Diller | 364/424.05 |
| 5,065,322 | 11/1991 | Mazur et al. | 364/424.05 |
| 5,073,860 | 12/1991 | Blackburn et al. | 364/424.05 |
| 5,185,701 | 2/1993 | Blackburn et al. | 364/425 |
| 5,216,607 | 7/1993 | Diller et al. | 280/735 |
| 5,243,544 | 9/1993 | Schoess | 364/566 |
| 5,337,238 | 8/1994 | Gioutsos et al. | 180/282 |
| 5,402,343 | 3/1995 | Shibata et al. | 364/424.05 |
| 5,431,441 | 7/1995 | Okano | 280/735 |

OTHER PUBLICATIONS

SAE Technical Paper Series 810809 Advanced Automotive Crash Recorder Design Development and Test Analysis, Keith Klaber, Jun. 8–12, 1981.

SAE Technical Paper Series 871963 A New Data Acquisition and Analysis System for Vehicle Crash Tests Using On Line Data Transfer Via Fiber Optics, W. Stauf, D. deVogl, M. Kasperowski, Oct. 19–22, 1987.

*Primary Examiner*—Kevin J. Teska
*Assistant Examiner*—Tan Nguyen
*Attorney, Agent, or Firm*—Mark Mollon

[57] ABSTRACT

Crash data from actual vehicle crashes is manipulated to produce new hybrid crash data which contains different acceleration peaks while retaining the overall characteristics of the original crash data. The new crash data is realistic and can be used to test or verify crash management components such as airbag deployment sensors and to demonstrate the robustness of components to different crashes without the expense of running another crash test.

11 Claims, 8 Drawing Sheets

VEHICLE CRASH DATA GENERATOR

BACKGROUND OF THE INVENTION

The present invention relates in general to testing of transportation vehicles, and more specifically to generating realistic crash data sets from other crash data sets without the expense of running another crash test.

In developing new vehicle models, automotive manufacturers conduct extensive crash testing. Such crash testing facilitates the design, validation, and testing of occupant restraint and other crash protection systems. In addition, government regulations require extensive impact testing of vehicles. Thus, an automotive manufacturer may conduct hundreds of vehicle crash tests each year.

Accelerometers in a test vehicle measure instantaneous acceleration at various locations within the vehicle during a crash. The accelerometer signals are each recorded separately using a data acquisition system. Many vehicles of an identical model are typically tested at various speeds and crash modes. Examples of crash modes are head on-collision with a barrier, slanted impact with a barrier, offset impact with another vehicle, and head on-collision with a pole. Crash testing of a single vehicle model typically includes more than one crash test at the same speed and same crash mode.

Accelerometers are used as crash sensors in production vehicles for deploying airbags, for example. Recorded data sets from crash tests provide information allowing development of a deployment procedure or algorithm used in a microprocessor to detect an occurrence of acceleration corresponding to impacts of such a type and severity that an airbag should be inflated. The microprocessor sends a firing signal to the airbag when it detects an acceleration corresponding to such an impact. The deployment procedure is developed for recognizing these events based on the data sets collected during crash testing of prototype vehicles. The crash data sets are collected from an accelerometer mounted at the same location within the prototype vehicle as the location where the production accelerometer will be mounted.

The data collected during the numerous crash tests fully characterize the crash performance of the vehicle. Nevertheless, even at the same crash mode and speed there are minor variations in instantaneous acceleration from crash to crash. Therefore, in order to further improve the robustness of a deployment procedure, an increased number of data sets for use in system development and validation would be useful.

SUMMARY OF THE INVENTION

The present invention has the advantage of creating realistic data sets for system development and validation of a crash sensor that accurately simulates a crash of a vehicle without requiring an additional crash test.

In one aspect, the present invention provides a method of obtaining crash data from vehicle crashes wherein first acceleration signals are recorded during a crash of a first vehicle and second acceleration signals are recorded during a crash of a second vehicle. A first frequency domain signal is generated by filtering and transforming the first acceleration signals, the first frequency domain signal being substantially limited to frequencies below a predetermined cutoff frequency. A second frequency domain signal is generated by filtering and transforming the second acceleration signals, the second frequency domain signal being substantially limited to frequencies above the predetermined cutoff frequency. The first frequency domain signal and the second frequency domain signal are added to produce a composite signal. The composite signal is inverse transformed to generate hybrid crash data having characteristics of both of the crashes of the first vehicle and the second vehicle.

DETAILED DESCRIPTION OF PREFERRED EMBODIMENTS

Figure 1:
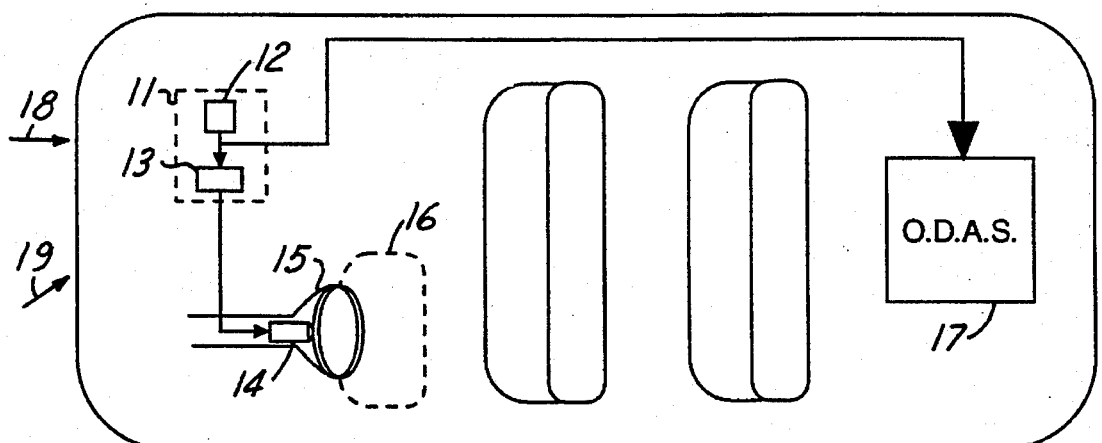
FIG. 1 is a schematic view showing a prototype vehicle of a particular model and including an accelerometer and an on-board data acquisition system.

FIG. 1 shows a vehicle 10 including a passive restraint module 11 having an accelerometer block 12 and a control block 13. In a final production vehicle, passive restraint module 11 controls an airbag firing unit 14 mounted in steering column 15, for example. When module 11 sends a firing signal to module 14, an airbag is inflated to the position shown at 16.

Accelerometer block 12 preferably includes both an accelerometer and a signal conditioning circuit, such as a lowpass filter for providing instantaneous acceleration signals to control block 13. During a crash test of a prototype vehicle, the instantaneous acceleration signal from accelerometer block 12 is provided to an on-board data acquisition system (ODAS) 17. As a vehicle is crashed, ODAS 17 records about 250 milliseconds of instantaneous acceleration data. The recorded data has a frequency spectrum from 0 Hz to about 4 kHz. The crashes are conducted in various crash modes according to different angles of impact and point of impact as shown by arrows 18 and 19, with various types of impacting objects such as barriers, poles, and other vehicles, and at various impact speeds.

Figure 2:
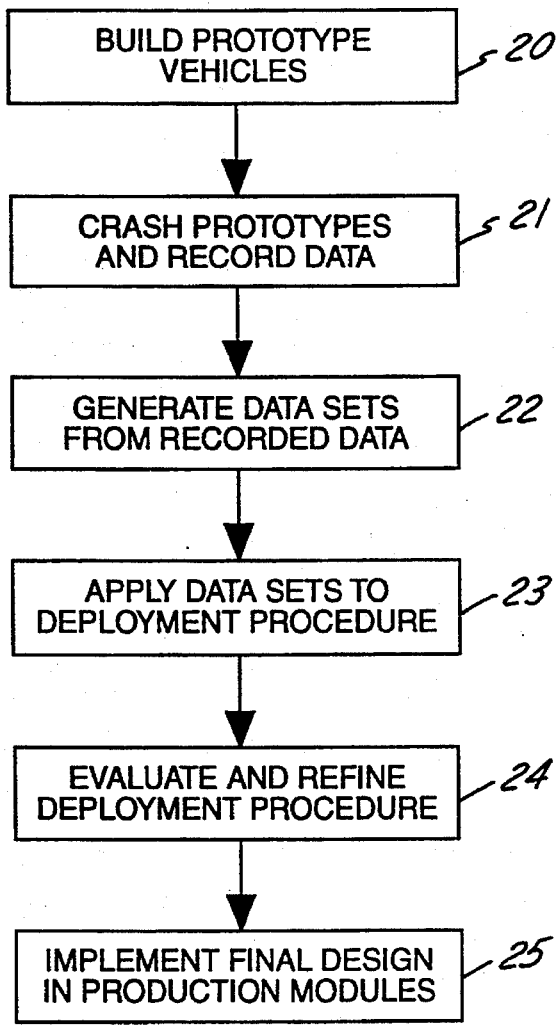
FIG. 2 is a flow chart showing a development process for a deployment procedure for a particular model vehicle.

FIG. 2 illustrates a procedure for deriving a deployment procedure used in control block 13 to detect whether an impact event is one in which a passive restraint should be deployed. In step 20, prototype vehicles are designed and manufactured having a substantially identical structural form and that are representative of the structure and structural strength of the final production vehicles. In step 21, the prototype vehicles are crashed in a plurality of modes and at a plurality of speeds while an on-board data acquisition system records data from the accelerometer in the form of instantaneous acceleration signals. In step 22, the signals are digitized for storage as a plurality of data sets, each set corresponding to signals from one accelerometer during one crash at a particular crash mode and speed. In step 23, the data sets are applied to an initial deployment procedure that may be derived empirically (such as a deployment procedure from a similar model vehicle). In step 24, the performance of the initial deployment procedure in response to the data sets is evaluated and the deployment procedure is refined as necessary to provide desired results of either firing an airbag or not firing an airbag as appropriate depending on the crash data applied. Once a final deployment procedure is validated and tested, it is implemented in final production modules for production vehicles in step 25.

Figure 3:
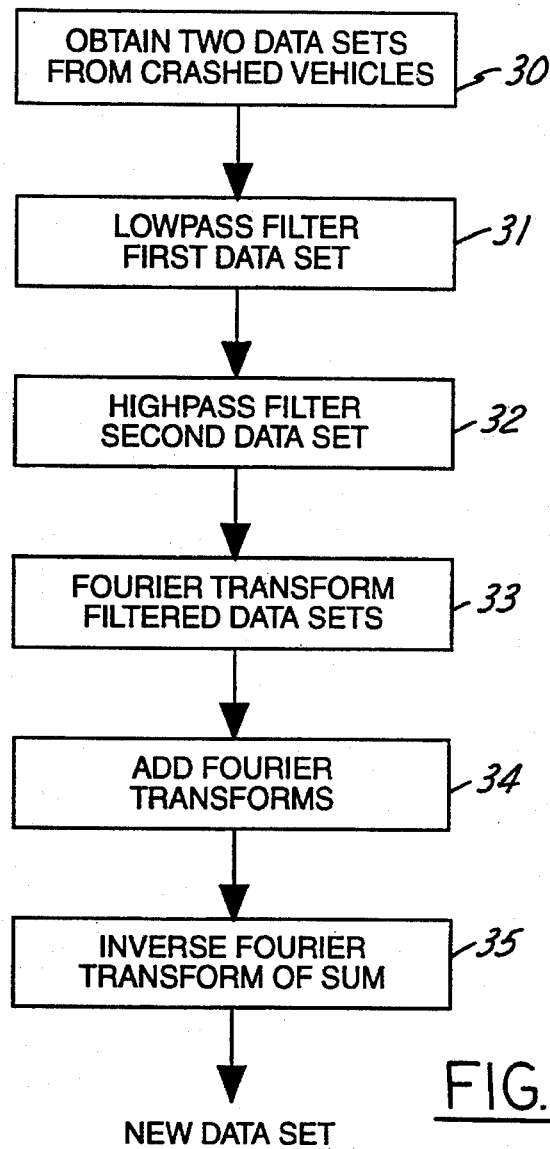
FIG. 3 is a flow chart showing a procedure for generating a new data set from two original data sets.

In order to improve the robustness of the deployment procedure, the generation of data sets in step 22 includes the generation of more data sets than there are crashes of prototype vehicles, using the present invention as further described in FIG. 3. In step 30, two data sets are obtained for purposes of generating a new data set. The two data sets selected may preferably be from first and second crashes at substantially identical crash modes and at substantially the same speed. It is desirable that the crash modes be identical or similar so that the instantaneous acceleration signals are gathered representative of the same vehicle components crushing during a crash. It is helpful if the two data sets were obtained at about the same speed so that the same components are crushing at about the same time in the two data sets. Nevertheless, useful data sets may be generated even when the crash modes and speeds are not substantially the same.

The present invention combines the two data sets in a manner to produce a new crash data set which contains different acceleration peaks while retaining the overall characteristics of the original crash data. In step 31, the first data set is low-pass filtered using a predetermined upper cutoff frequency of about 60 Hz. In step 32, the second data set is high-pass filtered using a lower cutoff frequency of about 60 Hz. The first and second filtered data sets are Fourier transformed into the frequency domain in step 33. In step 34 the two Fourier transforms are added to obtain a single Fourier transform and an inverse Fourier transform is applied to the sum in step 35 to generate the new data set. Alternatively, the Fourier transforms of step 33 could be conducted prior to the filtering in steps 31 and 32. In either embodiment, first and second frequency domain signals are derived prior to adding together the Fourier transforms.

A cutoff frequency for dividing the portions of the first and second data sets by filtering is selected at about 60 Hz because it has been found empirically that 60 Hz is about the upper limit of a base signal in the instantaneous acceleration signal that is more consistent from crash to crash than is a higher frequency signal beginning at about 60 Hz and extending up to the maximum frequency used in the deployment procedure (typically about 300 Hz). With an upper cutoff frequency of about 300 Hz, it follows from Nyquist's theorem that the recorded data signals during crashes must extend up to at least 600 Hz. Applicants have recorded instantaneous acceleration signals with an upper cutoff frequency of about 4 kHz and have generated new data sets from the recorded signals using an upper cutoff frequency of about 1 kHz.

Figure 4:
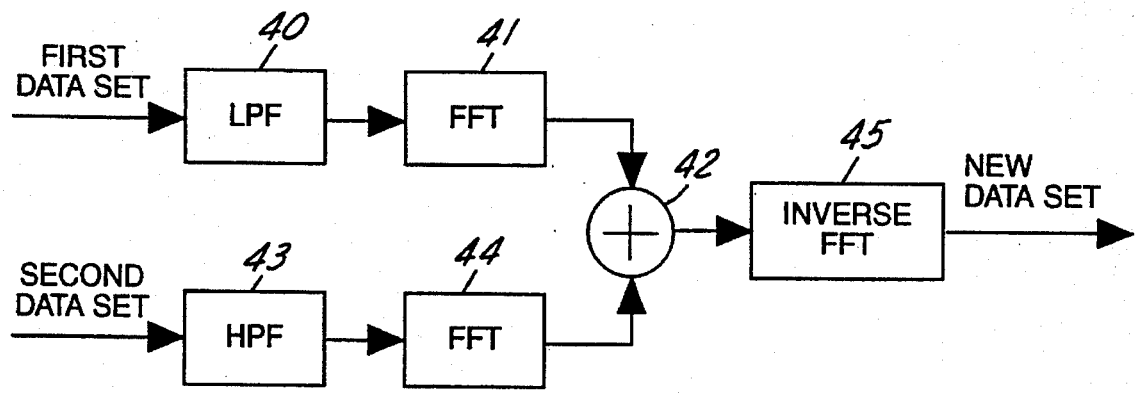
FIG. 4 illustrates an apparatus according to the present invention.

FIG. 4 illustrates an apparatus for practicing the present invention. A first data set is coupled into a lowpass filter 40 providing a lowpass filtered output to a fast Fourier transform (FFT) block 41. The transformed output in the frequency domain is coupled to one input of a summer 42. The second data set is coupled into a highpass filter 43 providing a highpass filtered output to a fast Fourier transform (FFT) block 44. A second frequency domain signal from FFT 41 is coupled to a second input of summer 42. Filters 40 and 43 can be implemented using Butterworth filters, for example.

Summer 42 produces a composite signal consisting of the sum of the first and second frequency domain signals. The composite signal is provided to inverse fast Fourier transform block 45 which produces a new data set signal in the time domain. The new data set characterizes a hybrid crash data that has characteristics of both of the first and second vehicle crashes but is different from either one. The new data is realistic of an actual crash and can be used in developing crash protection components or otherwise studying crash events for any purpose.

As in FIG. 3, the upper cutoff frequency of LPF 40 and the lower cutoff frequency of HPF 43 in FIG. 4 each correspond to about 60 Hz. In an alternative embodiment of the present invention, three or more original crash data sets may be combined to form a new data set. In that embodiment, one crash data set would provide the base signal through a lowpass filter having an upper cutoff of 60 Hz, thereby providing the base signal for the new crash data set. The remaining two or more original data sets would be split over the frequency spectrum of the highpass filter thereby generating yet another distinct hybrid crash data set which provides a realistic simulation of a crash. By dividing the high frequency spectrum into multiple zones and using various combinations of signals from the zones, a large number of hybrid crash data sets are generated. In yet another alternative embodiment, the highpass filtered data is statistically varied in generating yet another new data set. In one example, statistical variation is achieved by adding a randomized signal having a random value within predetermined limits to the original signal. The statistically varied upper frequency signal could even be from the same crash as provides the lower frequency base signals.

Figure 5:
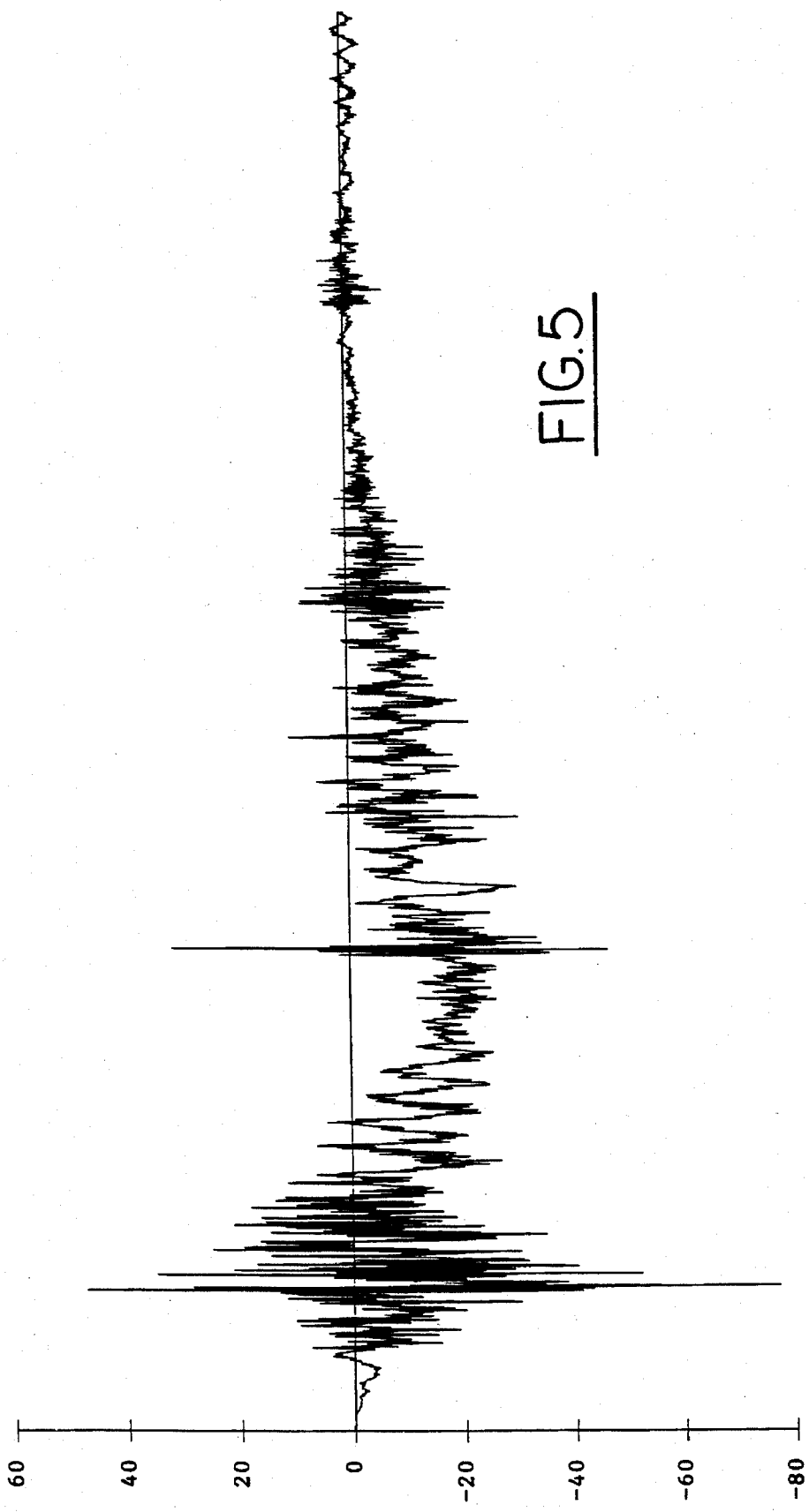
FIG. 5 is a plot of instantaneous acceleration during a first crash.

FIG. 5 shows an original crash data set from a first crash at a particular crash mode and crash speed. Acceleration peaks in the data set are utilized by a deployment procedure to recognize a crash where an airbag should be deployed.

Figure 6:
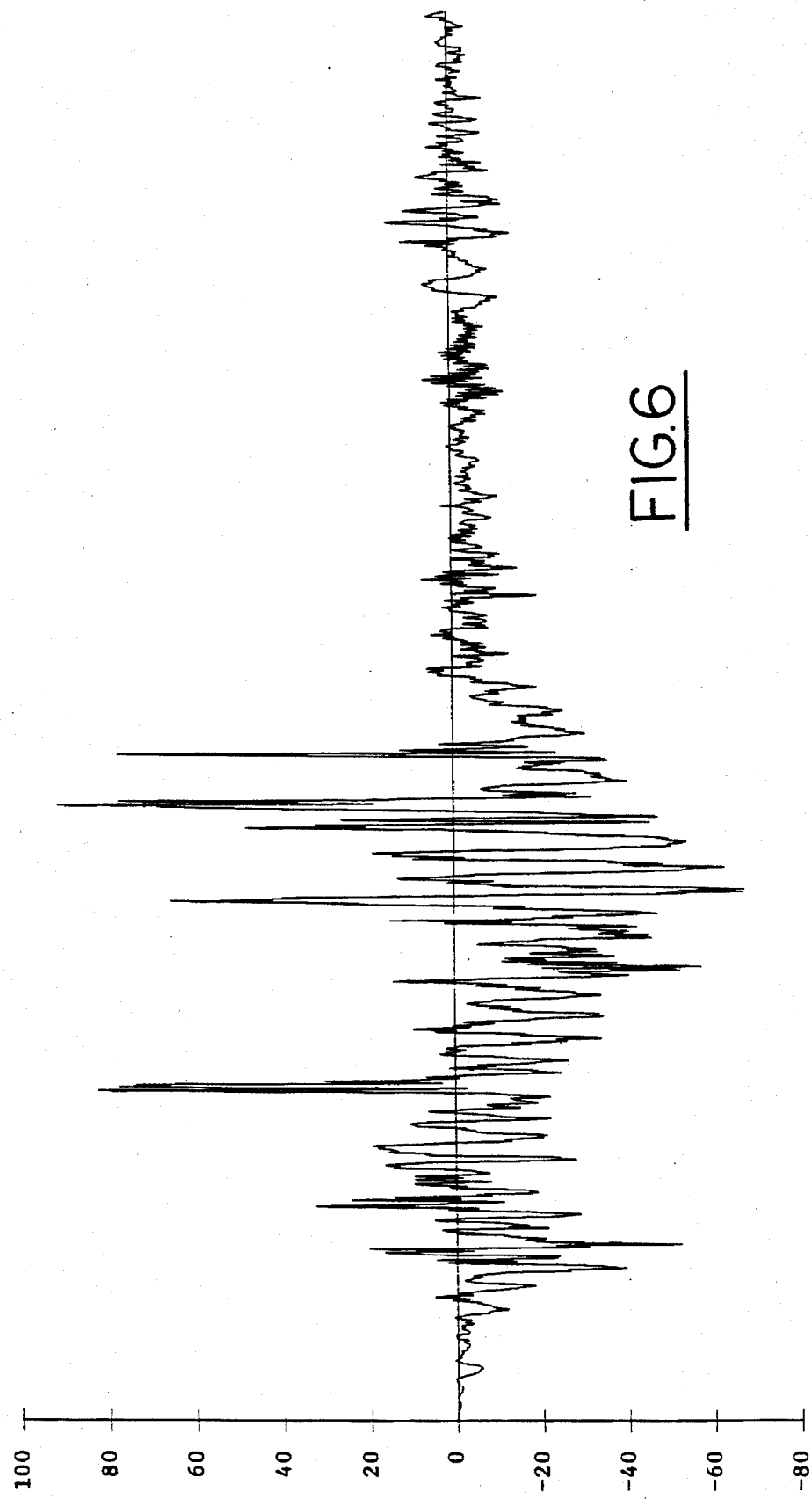
FIG. 6 is a plot of instantaneous acceleration during a second crash.

FIG. 6 illustrates a second data set obtained from a crash of a second vehicle in the same crash mode and crash speed as in FIG. 5. The variation in data between FIGS. 5 and 6 can be seen. A deployment procedure should nevertheless recognize both as an event where deployment of an airbag should be performed, for example.

Figure 7:
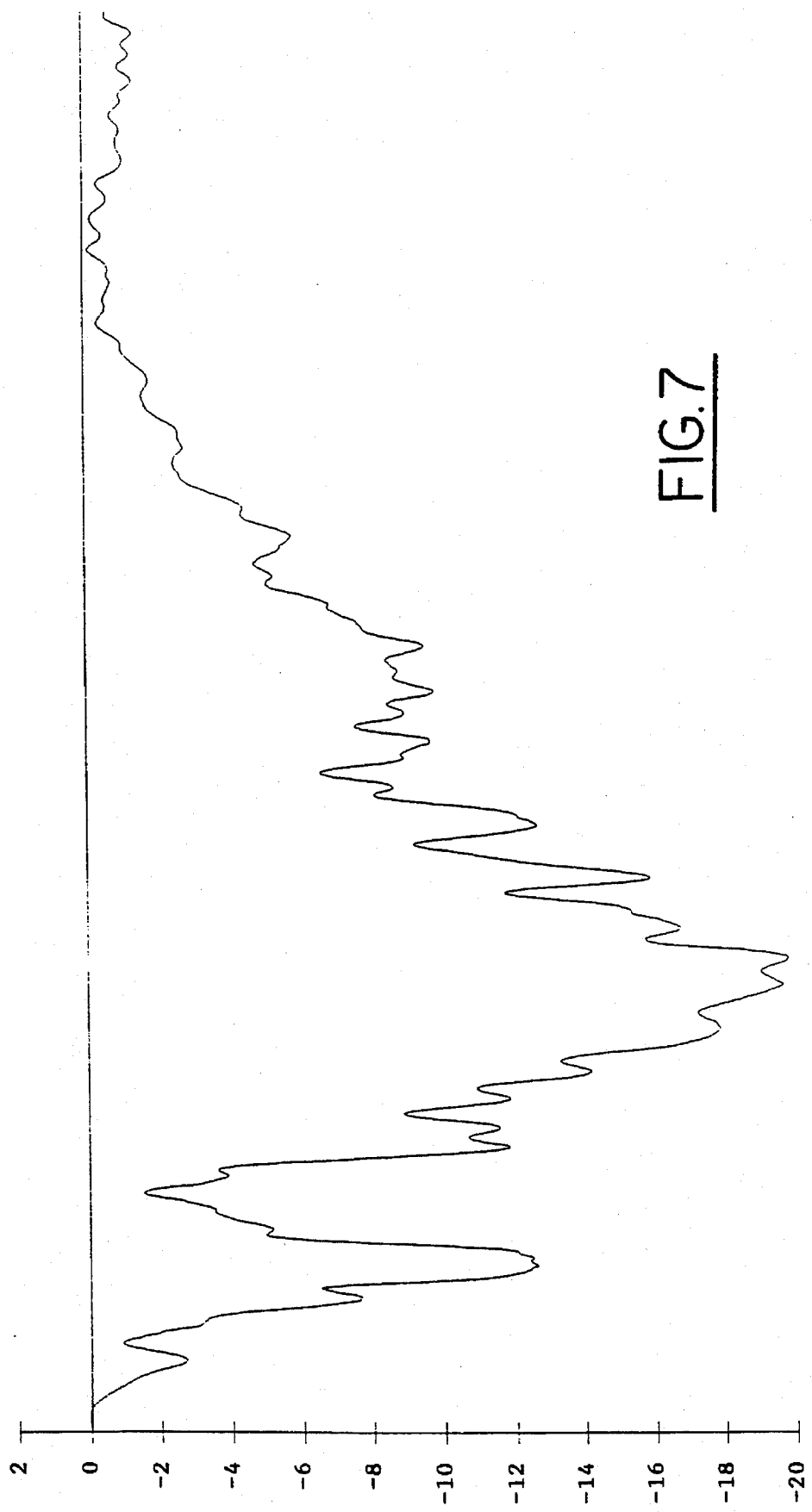
FIG. 7 shows the instantaneous acceleration of FIG. 5 after lowpass filtering.

FIG. 7 plots the data set of FIG. 5 after lowpass filtering with an upper cutoff frequency of 60 Hz. FIG. 7 corresponds to the base signal within the crash data.

Figure 8:
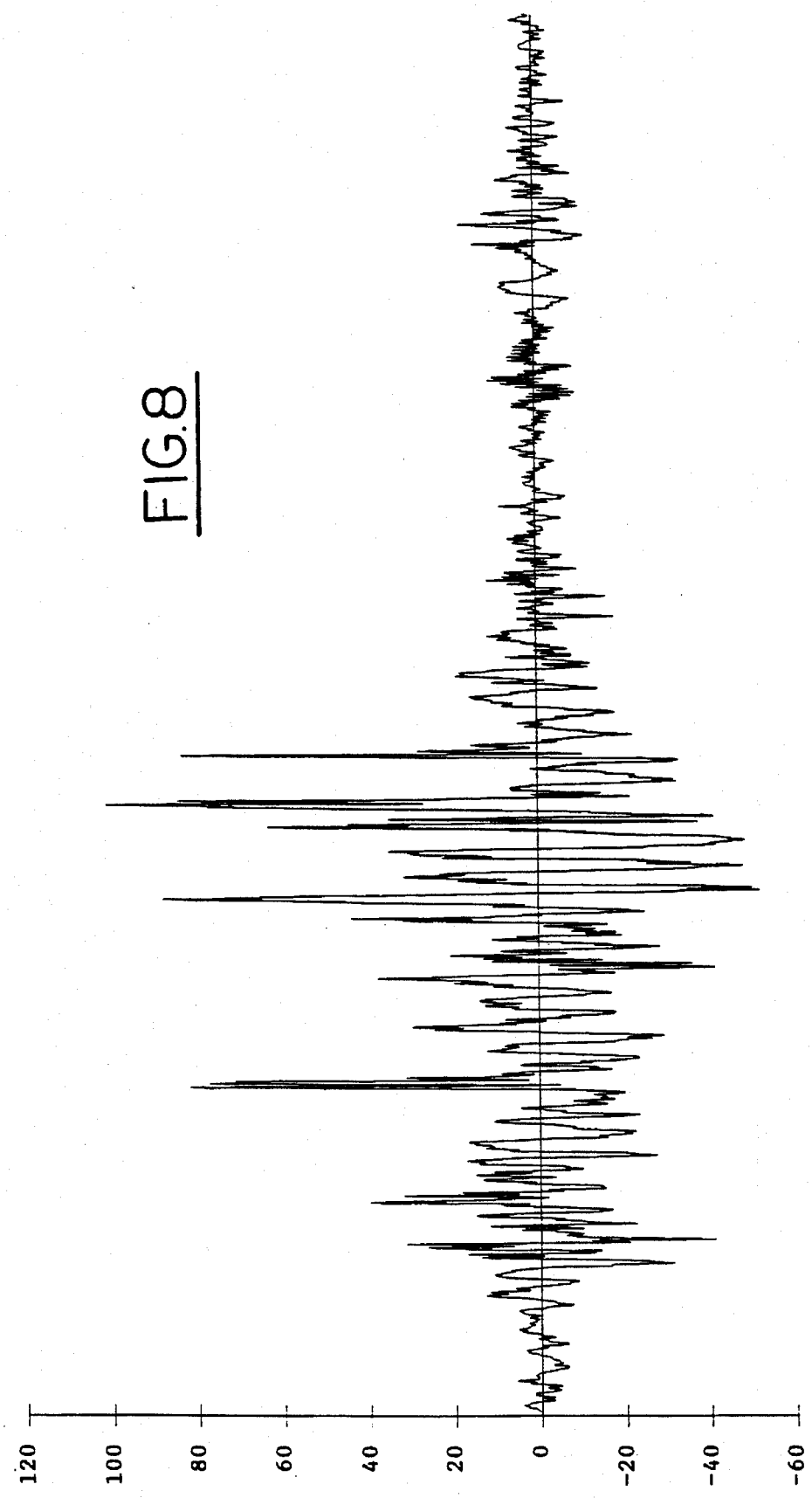
FIG. 8 shows the instantaneous acceleration of FIG. 6 after highpass filtering.

FIG. 8 shows the data set of FIG. 6 after highpass filtering with a lower cutoff frequency of 60 Hz and an upper cutoff frequency of 1 kHz. This upper frequency region is where the greatest variation occurs from crash to crash.

The data of FIGS. 7 and 8 are converted into the frequency domain using fast Fourier transforms as described above. The resulting transforms are summed and an inverse transform is performed to produce a time domain hybrid crash data set as shown in FIG. 9.

Figure 9:
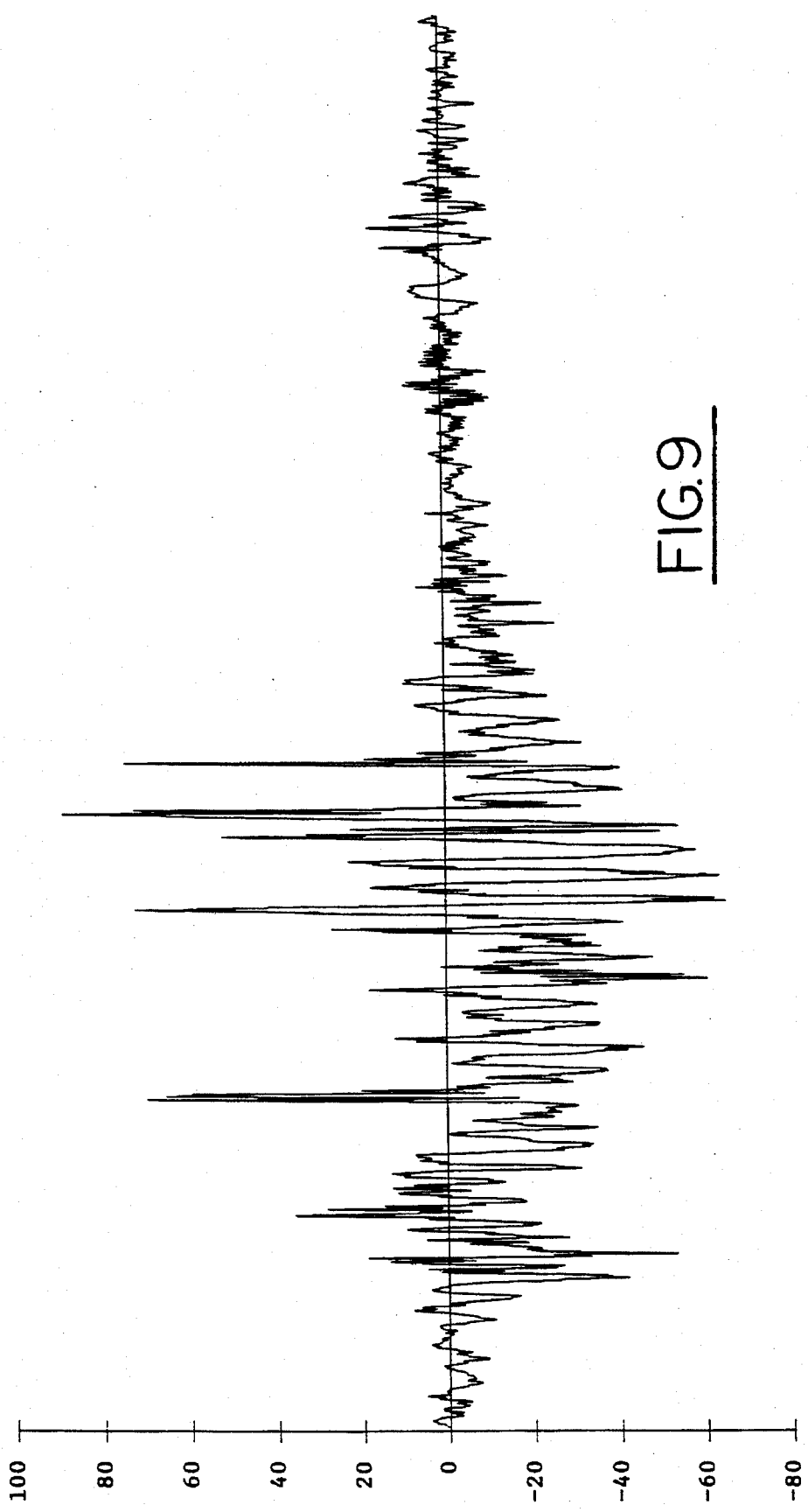
FIG. 9 is a time-domain plot of instantaneous acceleration for a new data set after adding together the frequency transforms of the data of FIGS. 7 and 8 and after performing an inverse Fourier transform.
Figure 10:
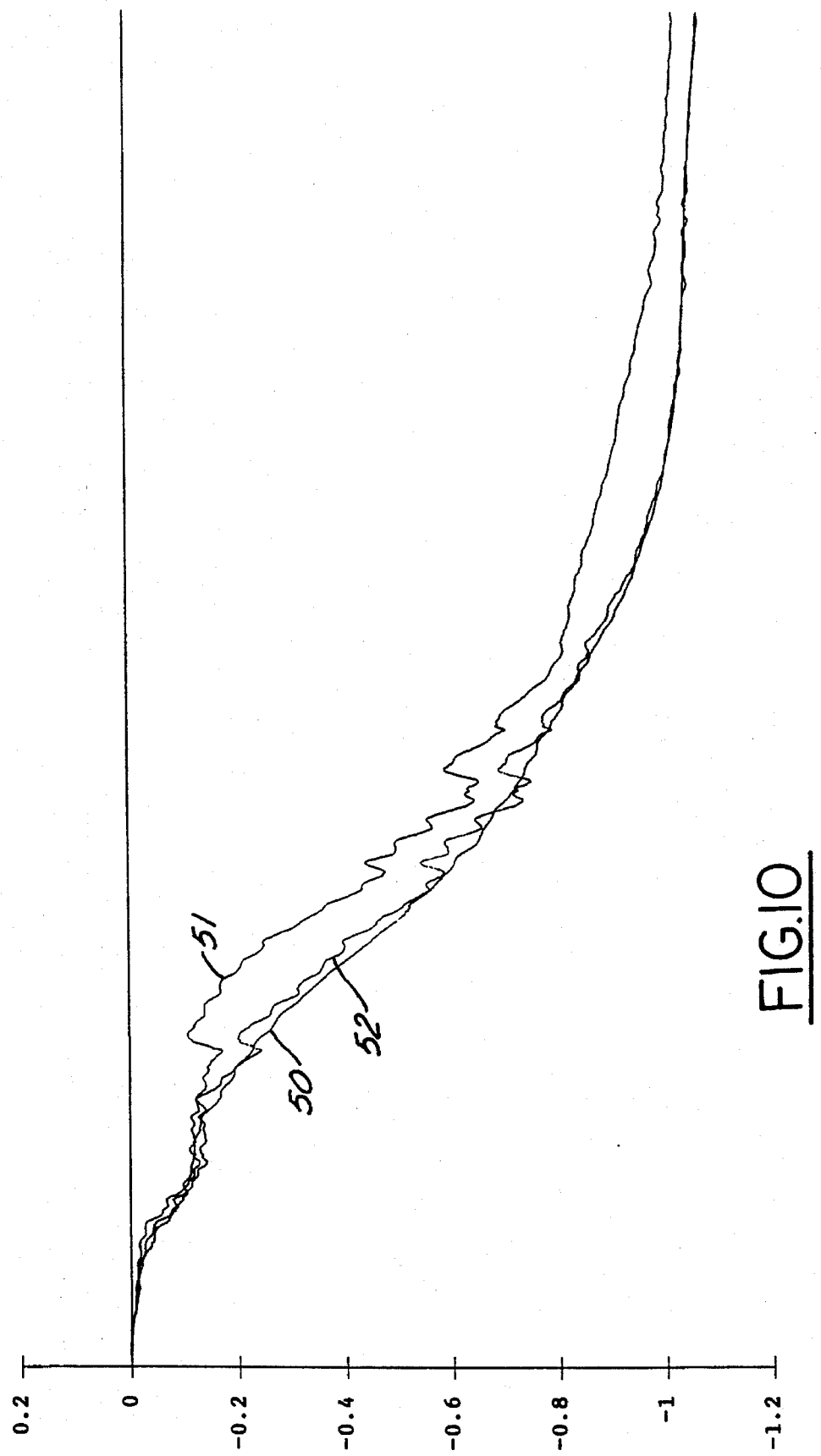
FIG. 10 is a plot comparing velocity of the first and second crashes with the velocity that would occur during the simulated crash corresponding to the new data set shown in FIG. 9.

FIG. 10 plots velocity during a crash corresponding to the data sets of FIGS. 5, 6, and 9. By integrating the instantaneous acceleration signals of the data sets, the resulting velocity shows the similarity of the new crash data to the original crash data. Line 50 represents the velocity during the first vehicle crash and line 51 represents velocity during the second vehicle crash. Line 52 shows velocity corresponding to the hybrid crash data obtained from the first and second crashes. Line 52 follows a baseline similar to line 50 and has a higher frequency appearance more closely resembling line 51. Thus, the hybrid crash data produces a realistic simulation of a crash and is useful in the design and development of a crash sensor as described above.

What is claimed is:

1. A method of obtaining crash data from vehicle crashes comprising the steps of:

recording first acceleration signals during a crash of a first vehicle;

recording second acceleration signals during a crash of a second vehicle;

generating a first frequency domain signal by filtering and transforming said first acceleration signals, said first frequency domain signal being substantially limited to frequencies below a predetermined cutoff frequency;

generating a second frequency domain signal by filtering and transforming said second acceleration signals, said second frequency domain signal being substantially limited to frequencies above said predetermined cutoff frequency;

adding said first frequency domain signal and said second frequency domain signal to produce a composite signal; and inverse transforming said composite signal to generate hybrid crash data having characteristics of both of said crashes of said first vehicle and said second vehicle.

2. The method of claim 1 wherein said cutoff frequency is about 60 Hz.

3. The method of claim 1 wherein said transforming is obtained using a Fourier transform and said inverse transforming is obtained using an inverse Fourier transform.

4. The method of claim 1 wherein said first and second vehicles have a substantially identical structural form.

5. The method of claim 1 wherein said crash of said first vehicle and said crash of said second vehicle are performed in a substantially identical crash mode.

6. The method of claim 1 wherein said crash of said first vehicle and said crash of said second vehicle are performed at about the same speed.

7. The method of claim 1 wherein said crash of said first vehicle and said crash of said second vehicle are performed in different crash modes at about the same speed.

8. The method of claim 1 further comprising the step of recording third acceleration signals during a crash of a third vehicle, wherein said third acceleration signals are filtered and transformed for inclusion in said second frequency domain signal.

9. Apparatus for generating crash acceleration data comprising:

a first crash set-up including a first accelerometer, said first crash set-up recording first acceleration signals from said first accelerometer during a crash of a first vehicle;

a second crash set-up including a second accelerometer, said second crash set-up recording second acceleration signals from said second accelerometer during a crash of a second vehicle;

a processor generating a first frequency domain signal by filtering and transforming said first acceleration signals wherein said first frequency domain signal is substantially limited to frequencies below a predetermined cutoff frequency, said processor further generating a second frequency domain signal by filtering and transforming said second acceleration signals wherein said second frequency domain signal is substantially limited to frequencies above said predetermined cutoff frequency, said processor adding said first frequency domain signal and said second frequency domain signal to produce a composite signal, said processor inverse transforming said composite signal to generate hybrid crash data having characteristics of both of said crashes of said first vehicle and said second vehicle; and a playback device reproducing said hybrid crash data to simulate a realistic crash of a vehicle.

10. The apparatus of claim 9 wherein said processor includes a lowpass filter, a highpass filter, a Fourier transformer, a signal combiner, and an inverse Fourier transformer.

11. The apparatus of claim 9 further comprising a third crash set-up recording third acceleration signals during a crash of a third vehicle, said processor filtering and transforming said third acceleration signals for inclusion in said second frequency domain signal.

* * * * *